United States Patent [19]
Dillingham

[11] 3,795,895
[45] Mar. 5, 1974

[54] POLLING INTERRUPT FOR DATA INFORMATION SYSTEM

[75] Inventor: Edward Dillingham, Pacific Palisades, Calif.

[73] Assignee: Data Source Corporation, El Segundo, Calif.

[22] Filed: Mar. 28, 1972

[21] Appl. No.: 238,897

[52] U.S. Cl. .......................... 340/163 R, 340/147 R
[51] Int. Cl. .......................... H04q 5/00
[58] Field of Search .......................... 340/163 R, 147 R

[56] References Cited

UNITED STATES PATENTS

| | | | |
|---|---|---|---|
| 3,146,456 | 8/1964 | Silliman | 340/163 R |
| 3,435,416 | 3/1969 | Kretsch | 340/163 R |
| 3,644,894 | 2/1972 | McCrea | 340/163 R |

*Primary Examiner*—Harold I. Pitts
*Attorney, Agent, or Firm*—Seidel, Gonda & Goldhammer

[57] ABSTRACT

A polling interrupt for a data information system in which a plurality of terminals on a single communication channel may be sequentially polled. The address subsequently transmitted over the communication channel is aborted upon a terminal having information to send recognizing its address and generating a carrier on a subchannel of the full duplex communication channel. Means are provided for generating a mark or "1" condition on the subchannel carrying the polling information wherein each address of the polling information has a space or "0" condition in one of its last bit positions.

10 Claims, 2 Drawing Figures

POLLING INTERRUPT FOR DATA INFORMATION SYSTEM

The present invention relates to a polling interrupt for a data information system. More particularly, the present invention relates to a polling interrupt for a data information system in which the polling of a plurality of terminals on a single full duplex communication channel may be carried on continuously until a terminal having data to transmit recognizes its address or signature and places a carrier on the receive portion of the full duplex communication channel. A subsequent address or signature, partially already sent, is aborted by placing a mark or other signal inconsistent with the value of one of the last bit positions which is common to each address or signature.

In data information systems, it is often necessary for a central data processor to communicate with a large number of remote terminals. The communication between the central data Processor and the remote terminals is often transmitted via leased telephone lines. If a leased telephone line, or two pairs of leased telephone lines in the case of a full duplex communication system, is used for each remote terminal, the cost of leasing lines for a large number of terminals becomes prohibitive.

In the past, a number of terminals have been connected to a single communication channel with means for addressing a terminal on the channel and then waiting for a response from that terminal. If the response from the terminal addressed or polled were negative, the next terminal would then be polled or addressed. However, when the transmission time delays for transmitting and receiving a signal, the time delay in recognizing a signature, and other inherent time delays in the equipment are considered, a considerable amount of time was required to poll a large number of terminals on a single line even if every terminal responded negatively. Therefore, in the case of a credit authorization system in which as many as 60 terminals may be on a single full duplex telephone line, a substantial time may be required to poll all 60 terminals even though the terminals are inactive, that is, the terminals do not desire to communicate with the central data processor.

In accordance with the present invention, a credit authorization system or other data information system having a plurality of remote terminals on a single full duplex communication channel may be polled rapidly in sequence with the polling operation being interrupted only if the terminal being addressed desires to communicate with the central data processor. in accordance with the present invention, each terminal has an address code having a predetermined value in one of its last bit positions. The address of each terminal on the channel is transmitted rapidly in sequence without a delay for each terminal to respond. The terminal only responds if it has information to transmit to the central data processor. When the terminal has information to transmit to the central data processor, it places a carrier on the receive subchannel of the full duplex channel. A signal or value inconsistent with the predetermined value in one of the last bit positions of each terminal address is then placed on the line thereby aborting any subsequent terminal address even though the succeeding terminal address may have been partially transmitted.

In a preferred embodiment of the present invention, the last bit of each address code is a space. Means are provided to generate the address code or polling signals for each of the terminals on a full duplex line. The polling signals are gated by gating means which is enabled by the output of a flip flop or other bistable circuit means which is set by a request to send signal. The polling signals are gated through a modulating transmitter which transmits the signals to all of the terminals via the transmit line pair of the full duplex communication line. When a terminal having a need to communicate with the central data processor recognizes its address or polling signal, that terminal places a carrier signal on the receive line pair of the full duplex communication line. A demodulating receiver detects the carrier and generates a carrier detect signal which causes the bistable circuit or flip flop to be reset. The resetting of the flip flop or bistable circuit means causes the gating means to be de-energized and causes a mark output to be fed to the modulating transmitter. The steady mark signal causes the succeeding address signal to be aborted since each address signal contains a space in its last bit position. Therefore, it is possible to abort the next address signal even though all of the succeeding address signal has been sent except the last bit. Therefore, even though significant transmission delays may be encountered, the succeeding address signal may still be aborted.

For the purpose of illustrating the invention, there are shown in the drawings forms which are presently preferred; it being understood, however, that this invention is not limited to the precise arrangements and instrumentalities shown.

Figure 1:
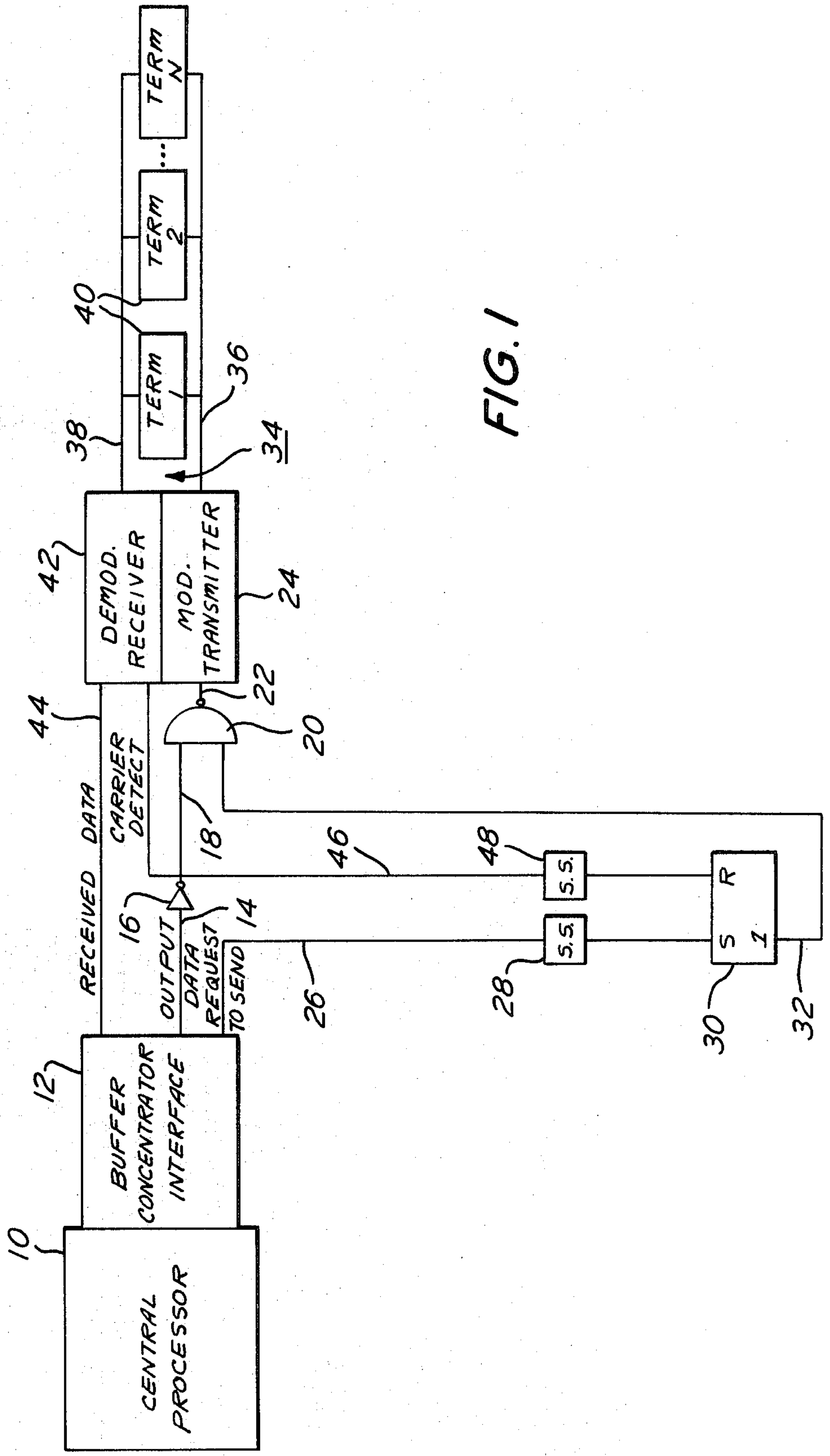
FIG. 1 is a schematic diagram, partially in block diagram form, of a system in accordance with the present invention.

Referring now to the drawings in detail, there is shown in FIG. 1 a central data processor 10 having a buffer-concentrator interface 12. The buffer-concentrator interface 12 provides output data on output 14. The output data is a series of address or signature codes during the polling operation. The output data may be other types of information such as the amount of credit available once communication has been established with a particular terminal. The output data is inverted by means of inveter 16 and fed to input 18 of gate 20. Gate 20 functions as an AND gate with an inverted output. This type of gate is sometimes referred to as a NAND gate. The output 22 of gate 20 is supplied to a modulating transmitter 24.

The buffer-concentrator interface 12 generates a request to send signal on line 26. The request to send signal, which may be a signal level, causes single shot 28 to be triggered. The output of single shot 28 causes bistable circuit or flip flop 30 to be set. The setting of flip flop 30 produces a "1" level on line 32. The "1" level on line 32 enables gate 20. Therefore, the output data on output 14 appears on output 22 and is received by the modulating transmitter 24 in the same phase as on line 14 due to the double inversion by gate 20 and inverter 16.

As shown in FIG. 1, the communication channel 34 may be comprised of two telephone line pairs to form a single full duplex communication channel. However, it is understood that various other types of full duplex communication channels may be used, such as microwave links or other forms of radio communication. The communication channel, as shown in FIG. 1, is comprised of a transmitting line pair 36 and a receiving line pair 38. A plurality of terminals 40 are connected to the transmitting line pair 36 and receiving line pair 38.

The receiving line pair 38 is used to transmit data from the terminals 40 which are received by the central data processor 10 via demodulating receiver 42. The demodulated received data is transmitted from the demodulating receiver 42 via line 44 to the buffer-concentrator interface 12 and central data processor 10. The demodulating receiver 42 also generates a carrier detect signal on line 46 as soon as a carrier is placed on receiving line pair 38 by a terminal 40. The leading edge of carrier detect signal on line 46 causes single shot 48 to be triggered. The output of single shot 48 causes bistable circuit or flip flop 30 to be reset. The resetting of flip flop 30 causes gate 20 to be disabled. Since the output 22 of gate 20 is inverted, this causes a mark signal to be fed to modulating transmitter 24 which aborts all succeeding address codes.

Figure 2:
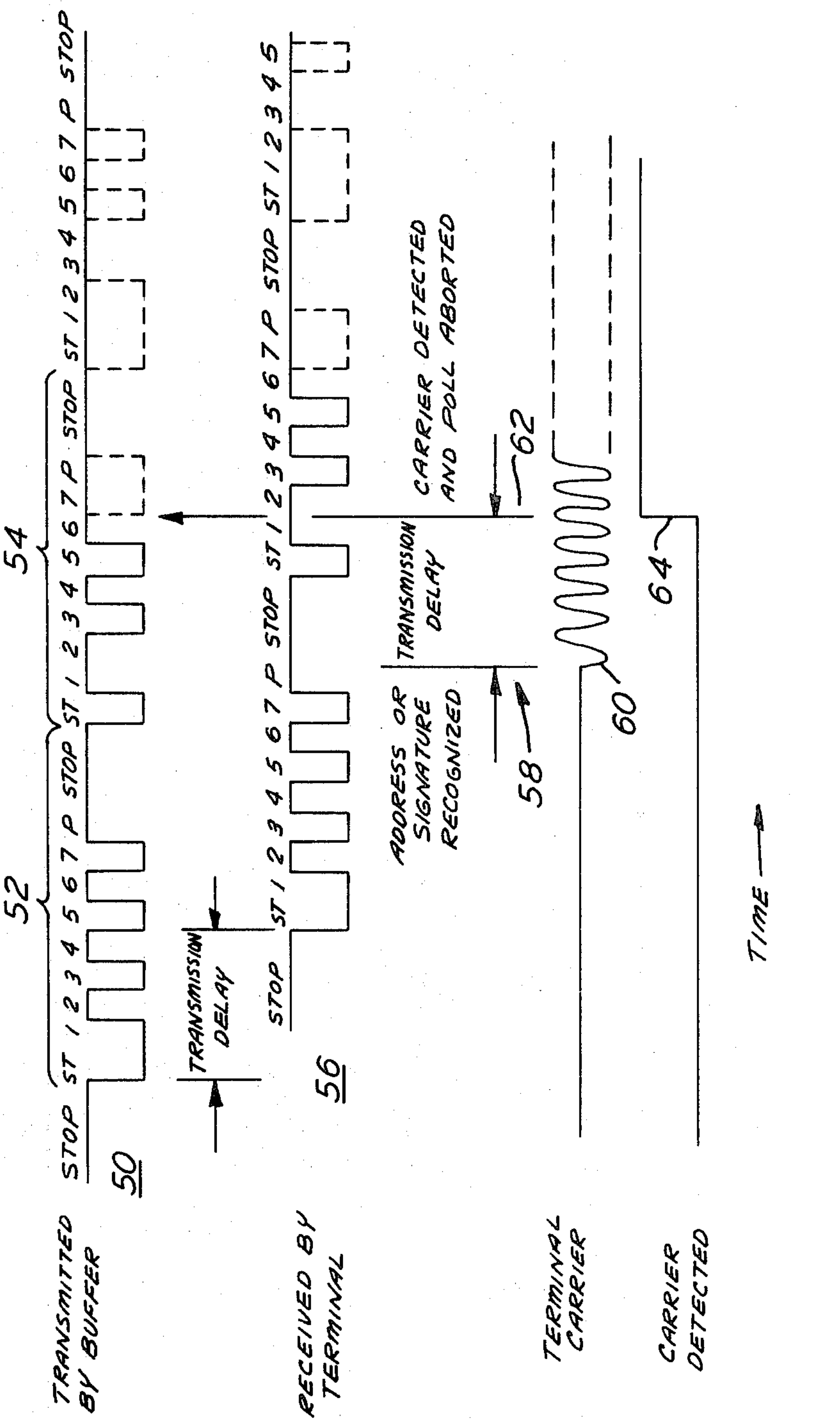
FIG. 2 is a timing diagram of signals occurring in the operation of the system shown in FIG. 1.

The operation of FIG. 1 may best be understood in conjunction with the timing diagram of FIG. 2. Referring to FIG. 2, the data 50 represents the output data on line 22 which is fed to modulating transmitter 24 which in turn is transmitted as a modulated signal on transmitting line pair 36. The data shown on line 50 represents polling data or a series of address codes of the various terminals 40. Address code 52 is comprised of a start bit, seven data bits, a parity bit P and a stop pulse. In the embodiment being illustrated, the seventh or last bit is always a space. By using the last bit, the maximum allowable transmission delay is provided for in the aborting of the succeeding address code. However, it is understood that in the present case the fourth, fifth, sixth or seventh bit could be the bit selected to have the space in each address code. Similarly, an address code could be utilized which has more than seven bits per address code in order to provide a longer allowable transmission delay, if necessary. Although it is preferable to abort the transmission of the next address code by placing a mark condition on the line in order to be able to use standard conventional teletype equipment at the terminals, it is also possible to use a continuous space signal to abort the transmission of the succeeding address wherein the last bit position in the code would then always be a mark or a "1."

Returning now to the description of a preferred embodiment and FIG. 2, there is shown in FIG. 2 a succeeding or next address code 54, shown partially in dotted lines. The dotted outline portion would be the address code sent if the address code were not aborted by placing a mark on the line. Referring to FIG. 1 in conjunction with FIG. 2, the output data on line 14 may comprise address code 52. Assuming that a request to send signal appears on line 26, flip flop 30 will be set to a "1" condition by single shot 28. The "1" condition on line 32 will enable gate 20. Therefore, the address code on line 14 will appear on output 22 and will be fed to modulating transmitter 24. Assuming that address code 52 is the address or signature of terminal N with a maximum transmission delay time equal to the time period of a start pulse plus four data bits. The delayed data received by terminal N is shown as data 56. Terminal N recognizes its address or singature 52 after receiving the seven data bits and the parity bit P. Terminal N recognizes its address or signature at time 58 shown in FIG. 2. Terminal N then generates a carrier signal 60 on receiving line pair 38. However, due to transmission delay, the carrier signal 60 is not received at demodulating receiver 42 until time 62. At this time the carrier is detected by demodulating receiver 42 and a carrier detect signal 64 is generated on line 46 at time 62. The leading edge of carrier detect signal 64 triggers single shot 48 which resets flip flop 30. The resetting of flip flop 30 causes the "1" signal to be removed from line 32 thereby causing gate 20 to produce a mark signal on line 22. This therefore causes a steady mark condition in data 50 causing the seventh bit of address or signature code 54 to be a mark. Since all valid address or signature codes of the terminals 40 contain a space in the seventh bit of their address codes, no terminal will recognize the second data word or address code 54 as shown in solid lines.

It may be noted that flip flop 30 is set by the output of single shot circuit 28. Therefore, even though a request to send level signal may be on line 26, flip flop 30 may be reset by a carrier detect signal on line 46 via single shot circuit 48. The single shot circuits 28 and 48 are triggered in response to the leading edge of signals on lines 26 and 46, respectively. It may also be noted that the output data on line 14 contains polling data during the polling operation. However, other information may be sent via line 14 during the periods of time when the central processor is communicating with a particular terminal.

It will be apparent to those skilled in the art that various modifications may be made within the spirit of the teachings of the present invention. For example, various other types of communication channels may be used. It may also be noted that although the receive and transmit communication subchannels 36 and 38 were referred to as line pairs, they may be different frequency channels on a single line pair. Various other types of gating means may be used for the gate combination comprised of gate 20 and inverter 16. Any suitable bistable circuit may be used as flip flop 30 and the single shots 28 and 48 may be incorporated, as part of an integrated circuit, into the bistable circuit means 30. Also, the present invention may be practiced by programming a computer to periodically sample the carrier detect signal output at a suitable rate and to transmit or cease transmitting address signals in accordance with the teachings of the present invention when a carrier detect signal is sensed.

In view of the above, the present invention may be embodied in other specific forms without departing from the spirit or essential attributes thereof and, accordingly, reference should be made to the appended claims, rather than to the foregoing specification as indicating the scope of the invention.

I claim:

1. A method of polling a plurality of terminals on a single duplex communication channel, comprising the steps of:

generating an address code for each terminal sequentially, each address code having a first predetermined value in one of a predetermined number of its last bit positions;

detecting on said single duplex communication channel a carrier generated by a terminal having information to transmit in response to said terminal recognizing its address; and terminating transmission, in response to detecting said carrier, over said single duplex communication channel of all succeeding address codes by causing a second predetermined value to be transmitted over said single duplex communication channel instead of said sequential address codes.

2. A method in accordance with claim 1 wherein said generating step generates an address code for each terminal having a first predetermined value in the last bit position of each of said address codes.

3. A method in accordance with claim 1 wherein said terminating transmission step includes the steps of:

resetting a bistable circuit means in response to detecting said carrier; and gating said second predetermined value to said plurality of remote terminals over said single duplex communication channel in response to resetting of said bistable circuit means.

4. In a data processing communication system having a plurality of remote terminals communicating with a central data processor, said plurality of remote terminals being connected to a single full duplex communication channel, each of said plurality of remote terminals having a predetermined address code, apparatus for controlling the polling of said plurality of remote terminals, comprising:

means for sequentially generating the predetermined address code of each of said plurality of remote terminals;

means for generating a request to send signal;

a demodulating receiver for receiving and demodulating signals received over a receive subchannel of said single full duplex communication channel, said demodulating receiver including a carrier detect means for detecting a carrier on said receive subchannel and generating a carrier detect signal;

bistable circuit means having a first input means responsive to said request to send signal to set an output of said bistable circuit means to a first output level and a second input means responsive to said carrier detect signal to reset said output of said bistable circuit to a second output level;

gating means having a first and a second input and an output, said first input receiving said output of said bistable circuit means and said second input receiving sequentially the address code of each of said plurality of remote terminals, said sequential address code appearing at said output of said gating means when said first input of said gating means is at said first output level of said bistable circuit means: and modulator transmitting means for receiving said output of said gating means and transmitting it over a transmit subchannel of said single full duplex communication channel to said plurality of remote terminals.

5. Apparatus in accordance with claim 4 wherein said address code generating means generates address codes having a predetermined value in the last bit position of each address code.

6. Apparatus in accordance with claim 4 wherein said gating means comprises an AND gate provided with inverting means in said second input and said output.

7. Apparatus in accordance with claim 4 wherein said single full duplex communication channel is a full duplex telephone line having a transmit line pair and a receive line pair.

8. Apparatus for polling a plurality of terminals on a single duplex communication channel, comprising:

means for generating an address code for each terminal sequentially, each address code having a first predetermined value in one of a predetermined number of its last bit positions;

means for detecting on said single duplex communication channel a carrier generated by a terminal having information to transmit in response to said terminal recognizing its address; and means for terminating transmission, in response to detecting said carrier, over said single duplex communication channel of the next partially transmitted address code and succeeding address codes by causing a second predetermined value to be transmitted over said single duplex communication channel.

9. Apparatus in accordance with claim 8 wherein said generating means generates an address code for each terminal having a first predetermined value in the last bit position of each of said address codes.

10. Apparatus in accordance with claim 8 wherein said means for terminating transmission includes a bistable circuit means adapted to be reset in response to the detection of said carrier by said detecting means, and gating means, said gating means gating the second predetermined value to said plurality of remote terminals over said single duplex communication channel in response to the resetting of said bistable circuit means.

* * * * *